United States Patent Office 3,511,095
Patented May 12, 1970

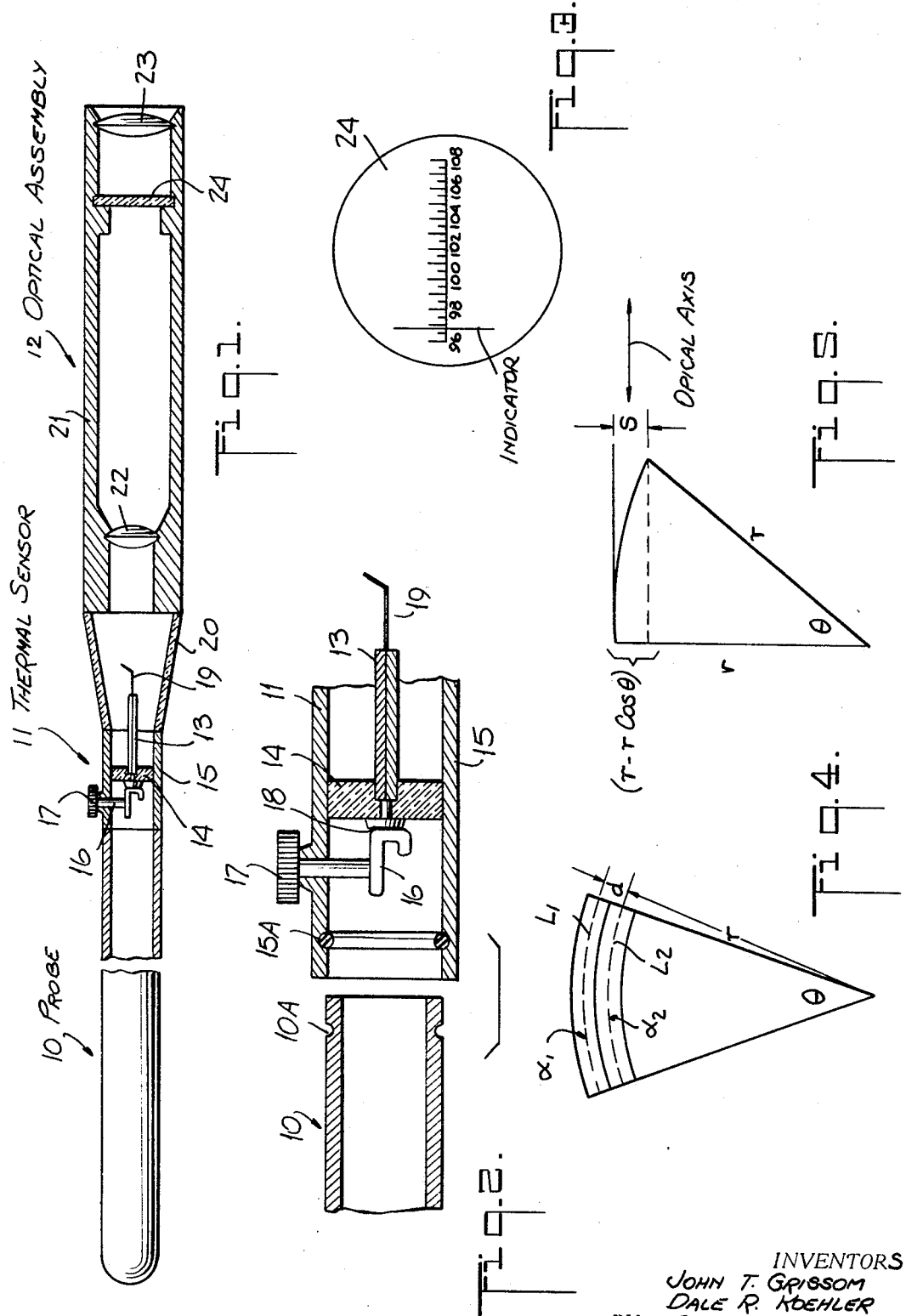

3,511,095
BIMETALLIC CLINICAL THERMOMETER
John T. Grissom, 901 W. Forest Blvd., Knoxville, Tenn. 37921; Dale R. Koehler, 601 Dale Court, River Vale, N.J. 07675; and Bernard M. Teschner, 255 Fort Hill Road, Scarsdale, N.Y. 10583
Filed July 31, 1968, Ser. No. 749,193
Int. Cl. G01k 5/70
U.S. Cl. 73—363.5          6 Claims

ABSTRACT OF THE DISCLOSURE

A clinical thermometer constituted by a thermal probe insertable in a body orifice, the probe being thermally coupled to a bimetallic strip which is caused to deflect to an extent determined by probe temperature, the deflection being optically magnified and observable on an indicator scale.

---

This invention relatse generally to clinical thermometers, and more particularly to an instrument having a bimetallic element whose deflection in response to body heat is optically magnified and observable on an indicator scale.

The standard clinical thermometer, which is almost universally used, consists essentially of a small, evacuated glass tube having a uniform bore, one end of the tube being closed, the other end communicating with a bulbous mercury chamber. A centigrade or Fahrenheit scale is etched on the front face fo the glass tube, the opposite side being milky or opaque to facilitate reading of the scale. When the thermometer is inserted and body heat applied thereto, the expanding mercury rises past a narrow point up the tube, which point prevents the mercury column from sinking back until shaking forces it down.

Hence, in practice, mercury will gradually rise in the inserted tube until it attains a level on the scale indicative of body temperature, after which the tube is withdrawn from contact. The withdrawn tube is now in an environment at room temperature, but the body temperature reading will be maintained until the tube is shaken.

Standard clinical thermometers are quite difficult to read, for one must be able to see the head of an extremely thin mercury column against the etched scale. Since the available light for this purpose may be poor and the mercury column is only visible when the glass tube is held at a particular angle, one cannot readily find the reading point. Moreover, a glass thermometer is a delicate instrument and where, as in a hospital, the instrument is in repeated use, frequent breakages are encountered.

Another drawback incident to standard thermometers, is the amount of time it takes to obtain a reading, for while only two or three minutes is all that may be necessary to cause the mercury to reach its proper level on the scale, when a medical attendant is required to take numerous readings in the course of his daily rounds, the time dictated by each reading becomes an important factor in the work load imposed on the attendant.

Attempts heretofore made to replace mercury-type clinical thermometers with electrical instruments obviating the above-noted drawbacks, have had only limited success. Thus it has been suggested to use a thermally-responsive transducer, such as a thermistor, to sense body temperature. Body temperature is thereby converted into a corresponding electrical voltage which is indicated by a suitably calibrated voltmeter. While such instruments have a rapid response time and are effectively unbreakable, their accuracy depends on the existing level of battery voltage which tends to vary with time. Hence it is necessary periodically to zero-set the instrument before taking a reading.

Accordingly, it is the main object of this invention to provide a simple and erliable clinical thermometer requiring little or no training on the part of the user, the instrument having a relatively rapid response time and being very easy to read.

More specifically, it is an object of the invention to provide a clinical thermometer which includes an insertable thermal probe adapted to be coupled to a bimetallic element, the deflection of the element in response to changes in temperature being indicated along a small, optically-magnified scale.

A significant advantage of the instrument in accordance with the invention, is that it may be economically mass-produced and that it lends itself to the usual clinical sterilization techniques. In one embodiment of the instrument, the thermal probe is separable from the bimetallic element and optical assembly, whereby the probe is disposable, thereby dispensing with the need for re-sterilization.

Briefly stated, these objects are attained in a clinical thermometer comprising an elongated probe which is insertable in a body orifice to sense temperature, the probe being coupled to a bimetallic element having a pointer attached thereto, which is deflected as a function of body temperature. Trained on the pointer is a miniature optical microscope which incorporates a scale calibrated in terms of temperature, whereby the magnified deflection of the pointer is seen along the scale.

For a better understanding of the invention, as well as other objects and further features thereof, reference is made to the following detailed description to be read in conjunction with the accompanying drawings, wherein:

FIG. 1 is a longitudinal section taken through a clinical thermometer in accordance with the invention;

FIG. 2 is an enlarged view of the bimetallic element and of its associated structure;

FIG. 3 separately shows the scale on the screen;

FIG. 4 is a diagram explanatory of the behavior of the bimetallic element; and

FIG. 5 is a second explanatory diagram.

Referring now to the drawing, and more particularly to FIG. 1, the clinical thermometer in accordance with the invention is constituted by three main components; namely an insertable probe 10, a thermal sensor, generally designated by numeral 11, and an optical indicator assembly, generally designated by numeral 12.

Probe 10 need be nothing more than a cylindrical tube made of aluminum or metal-coated plastic material having a high thermal conductivity and heat capacity, the tube being closed at one end. The probe dimensions are similar to those of a conventional mercury thermometer whereby the probe may be inserted orally or anally in the usual fashion. In contradistinction to the usual glass thermometer, the metal probe makes good thermal contact with the body over an extended area, so that it quickly assumes body temperature and retains heat.

Thermal sensor 11, which is coupled to the probe and serves to detect the body heat transmitted thereby, is formed by a small bimetallic strip 13 permanently supported at one end of an insulating mount 14 held within a metallic sleeve 15 which is joinable to the end of probe 10. Mount 14 is made of a material such as Bakelite or a ceramic having poor thermal conductivity, thereby thermally isolating bimetallic strip 13 from sleeve 15 and hence from probe 10.

In order thermally to connect the bimetallic strip to the probe and thereby cause the strip to sense probe temperature, there is provided a thermal switch constituted by a movable arm 16 whose position is adjustable by means of an external knob 17 and is adapted at the "on" position to engage a fixed contact 18 on the underside of the mount. Contact 18 is thermally linked to the bimetallic strip.

Thermal switch arm 16 and contact 18 are fabricated of a metal such as copper, having high thermal conductivity such that when the switch is "on," a thermal path is completed between the probe and bimetallic element to cause the bimetallic element to heat up to a degree depending on body heat and to deflect as a function thereof.

An indicator pointer 19 is secured to the free end of bimetallic strip 13 and moves therewith, the pointer extending into the conical nose 20 of the optical assembly. Nose 20, which is made of a transparent plastic material such as acrylic, is coupled at one end to sleeve 15, the other end thereof being attached to the cylindrical casing 21 of a miniature elementary microscope including an objective 22 and an eyepiece 23.

An elementary microscope consists of two lenses, one of which is of very short focal length and is called the objective. The other lens, which is of longer focal length, is designated the ocular, or eyepiece. While in practice these two lenses may actually contain several optical elements, their principal functions are as follows:

The object to be viewed by the microscope, which in this instance is moving pointer 19 on the bimetallic element (or the end of the element itself), is located just beyond the primary focal point of the objective 22, and is illuminated by light entering the transparent conical nose 20, thereby forming a real image on the opposite side of the objective. To augment the illumination, the front end of the probe may be provided with a window. This real image becomes the objective for the eyepiece 23, which functions as a magnifier and forms a large virtual image at a distance in advance of the objective. The virtual image becomes the object for the eye itself, which forms the final real image on the retina.

Because of the very short focal length of the objective, the microscope is incapable of seeing anything remote from the pointer, hence the other elements of the sensor are not visible through the eyepiece.

A transparent display screen 24, as shown separately in FIG. 3, is placed in front of the eyepiece. The screen which may be made of glass has indicia engraved or etched thereon forming a scale calibrated in terms of Fahrenheit from 96° to 108°, which range represents the usual body temperature limits. The scale can, of course, also be calibrated in terms of centigrade. Hence the deflection of pointer 19 is seen against the transparent scale, and an observer has no difficulty whatever in reading body temperature.

To clarify the behavior of the bimetallic strip, we now refer to FIG. 4. Two metal strips each of length $L_0$ and thickness $d$ at temperature $T_0$ are joined together so that their ends coincide. The two strips have different coefficients of linear expansions $\alpha_1$ and $\alpha_2$, as shown, where $\alpha_1 > \alpha_2$. When strip 13 is heated to a temperature $T_0 + \Delta T$, one strip becomes longer than the other. As a consequence the bimetallic strip bends into the arc of a circle.

Tensions and compressions will develop in the strip as it bends. Roughly speaking, the central line of each strip will be free of such forces and will expand as though the whole strip were free. Let $L_1$, therefore, represent the expanded length of the upper strip and $L_2$ that of the lower strip. The separation of these lines is $d$. Assuming that $d$ is very small compared to $r$, then:

$$L_2 = r\theta \quad (1)$$
$$L_1 = (r+d)\theta \quad (2)$$

so that, $$\frac{L_1}{L_2} = 1 + \frac{d}{r} \quad (3)$$

But also, $$\frac{L_1}{L_2} = \frac{L_0(1+\alpha_1 \Delta T)}{L_0(1+\alpha_2 \Delta T)}$$

so that, $$\frac{L_1}{L_2} \cong 1 + (\alpha_1 - \alpha_2)\Delta T \quad (4)$$

$$r = \frac{d}{(\alpha_1 - \alpha_2)} \Delta T \quad (5)$$

From FIG. 5 we have $$S = r(1 - \cos \theta) \quad (6)$$

where S is the deflection of the end of the bimetallic strip seen by the optics of the instrument. This is the deflection which is projected onto screen 24 by the objective lens.

It is to be noted that no consideration has been given to the mechanical magnification resulting from extending a pointer beyond the end of the bimetallic strip. If this is done, the end of the bimetallic strip will have to deflect less than S, which would then be the deflection distance of the pointer. In what follows, we consider the end of the strip to be the pointer.

The angle $\theta$ in radians is given by $$\theta \cong L_0/r \quad (7)$$

Combining Eqs. 5, 6, and 7 we get $$S = \frac{d}{(\alpha_1 - \alpha_2)} \Delta T \left\{ 1 - \cos\left[\frac{L_0(\alpha_1 - \alpha_2)\Delta T}{d}\right] \right\} \quad (8)$$

which is the final expression relating the deflection S with the parameters of the bimetallic strip and the temperature change.

We must, therefore, have a bimetallic strip whose width and thickness are small with respect to its length to satisfy the conditions under which Equation 8 was derived. At the same time, the width and thickness should be sufficiently large to insure structural rigidity and to prevent the bimetallic strip from vibrating noticeably when the pointer is viewed through the microscope. In addition, it must be borne in mind that $r$ in Equation 5 must be much larger than $d$. We will now perform a calculation to indicate that these conditions can be met in practice.

Let us assume that the scale on the display screen is about 0.25" long and that the gain of the objective lens is 10. Consequently, the bimetallic strip must move through a distance of 0.025", to correspond to full scale coverage, when the temperature changes by 12 F., for example, from 96° F. to 108 F. Thus we want $S = 0.025''$ when $\Delta T = 7°$ C. For convenience and structural strength, let us choose $d = 0.0005''$ which corresponds to a bimetallic strip whose total thickness is $2d = 0.001''$. Then from Equation 5

$$r = \frac{0.005''}{8 \times 10^{-6}} \times 7 = 8.9''$$

so that $r \gg d$, as required.

From Equation 8 we can solve for $L_0$ with $d = 0.0005''$, $(\alpha_1 - \alpha_2) = 8 \times 10^{-6}$ per ° C., $\Delta T = 7°$ C., and $S = 0.025''$ to get $$L_0 = 0.67''$$

which we see is a practicable value. The width of the strip can be chosen now to be somewhere in the neighborhood of 0.10" or so, thereby satisfying all requirements.

It is to be noted that if $L_0$ is to be approximately in the neighborhood of 0.5" and $r$ is on the order of 5"—10", as we found above, then $\theta \cong 0.10$ radian or less, and we can use the approximation $$1 - \cos\left[\frac{L_0(\alpha_1-\alpha_2)\Delta T}{d}\right] \simeq \left[\frac{L_0(\alpha_1-\alpha_2)\Delta T}{d}\right]^2$$

to rewrite Equation 8 as, $$S = L_0^2(\alpha_1-\alpha_2)\Delta T \qquad (9)$$

and, $$L_0 = \left[\frac{Sd}{(\alpha_1-\alpha_2)\Delta T}\right]^{1/2} \qquad (10)$$

From Equation 9, it will be noted that the deflection distance is a linear function of the temperature. This means, of course, that the scale on the display screen can be a linear scale with negligible error under the conditions calculated above, which we have seen can be met in practice.

With respect to the operation of the thermal switch, it is to be noted that if the bimetallic element were directly and permanently connected to the thermal probe, then when the probe is withdrawn from contact with a patient, its temperature will shortly thereof assume ambient temperature so that a body temperature reading will not appear on the scale.

To maintain a body-temperature reading after the probe is withdrawn from body contact, the thermal switch, which is "on" when there is body contact, is turned off as soon as the probe is withdrawn. In this condition, the small bimetallic element becomes thermally isolated from the probe and because of its small radiating surface, it loses heat very slowly. Hence the bimetallic element maintains a proper indication of body temperature for a period more than sufficient to provide a reading thereof. It is not, of course, necessary to shake the bimetallic thermometer, and all that need be done, is to close the switch before the next reading is taken.

The action of the thermal switch is analogous to an electrical arrangement in which a resistor of high value is permanently connected across a charged capacitor, a second resistor of low value being selectively shunted across the capacitor by a switch. When the second resistor is disconnected, the capacitor (analogous to the heated bimetallic element) discharges slowly through the first resistor, but when the switch is closed, the capacitor discharges quickly through the second resistor.

It is possible to avoid the use of a thermal switch by an arrangement in which the thermal probe may be readily coupled and decoupled from the thermal sensor, as by a simple snap-action. This may be accomplished by the use of a flexible probe metal, the end of the probe, as shown in FIG. 2 having a circumferential notch 10A therein, to permit the end to snap into a complementary detent 15A on the sleeve on the thermal sensor.

In this modification, one may dispense with the thermal switch and provide a permanent thermal connection between contact 18 and sleeve 15 such that when the probe is coupled to the sleeve, the bimetallic strip is heated to probe temperature, this being the relationship when the probe is in body contact. When the probe is thereafter withdrawn from the body, it is immediately decoupled from the sleeve, thereby breaking the thermal connection so that the bimetallic element is not thermally discharged and holds the body temperature indication.

With an arrangement of this type, the probe may be discarded after use, thereby dispensing with the need for resterilization.

While there have been shown and described preferred embodiments of a bimetallic clinical thermometer in accordance with the invention, it will be appreciated that many changes and modifications may be made therein without, however, departing from the essential spirit of the invention as defined in the annexed claims.

What we claim is:
1. A clinical thermometer comprising:
    (a) an elongated probe of high thermal conductivity adapted to be inserted in and to make contact with the body of a patient whose temperature is to be taken,
    (b) a thermal sensor coupled to said probe and including a bimetallic element which is thermally isolated from said probe and a thermal switch for selectively connecting one end of said element to the probe whereby said element is caused to deflect to an extent determined by body temperature,
    (c) a pointer attached to the free end of the element, and
    (d) an optical assembly coupled to the sensor and including a microscope trained on the pointer and having a calibrated transparent screen incorporated therein to display the pointer position.

2. A thermometer as set forth in claim 1, wherein said probe is constituted by an elongated metal tube coupled at one end to said thermal sensor.

3. A thermometer as set forth in claim 2, wherein said tube has a window at the other end thereof.

4. A thermometer as set forth in claim 1, wherein said assembly includes a transparent nose into which said pointer extends.

5. A thermometer as set forth in claim 1, wherein said microscope includes an objective and an eyepiece, and wherein said screen is of transparent material and is placed before said eyepiece.

6. A thermometer as set forth in claim 1, including means to decouple said probe from said sensor to render said probe replaceable.

References Cited

UNITED STATES PATENTS

| | | | |
|---|---|---|---|
| 1,918,556 | 7/1933 | Pfau | 350—114 |
| 2,321,846 | 6/1943 | Obermaier. | |
| 3,351,455 | 6/1944 | Pratesi | 73—272 |
| 3,448,619 | 6/1969 | Howard et al. | 73—363.7 |

FOREIGN PATENTS 628,024 10/27 France.

S. CLEMENT SWISHER, Primary Examiner

D. M. YASICH, Assistant Examiner

U.S. Cl. X.R.

350—114